United States Patent [19]

Herman et al.

[11] Patent Number: 5,063,362

[45] Date of Patent: Nov. 5, 1991

[54] SUPPRESSION OF ELECTRICAL INTERFERENCES FROM AN ELECTRONIC CIRCUIT

[75] Inventors: Philip A. Herman, Hyde Park; William F. McCarthy, Wappingers Falls, both of N.Y.

[73] Assignee: International Business Machines Corporation, Armonk, N.Y.

[21] Appl. No.: 519,528

[22] Filed: May 4, 1990

[51] Int. Cl.[5] ............ H04B 3/28

[52] U.S. Cl. ............ 333/12; 333/246; 333/99 R; 455/310

[58] Field of Search ............ 333/12, 202, 204, 246, 333/99 R; 330/149, 305, 306; 455/80, 283, 286, 296, 307, 310

[56] References Cited

U.S. PATENT DOCUMENTS

| | | | |
|---|---|---|---|
| 1,576,667 | 3/1926 | Mauborgne et al. | 455/286 X |
| 1,939,053 | 12/1933 | Hunt | 333/202 |
| 2,176,963 | 10/1939 | Braaten | 333/202 X |
| 3,936,778 | 2/1976 | DeRonde | 333/246 |
| 4,137,501 | 1/1979 | Kuroyanagi et al. | 455/283 |
| 4,837,524 | 6/1989 | Nakamura | 333/26 X |

*Primary Examiner*—Paul Gensler
*Attorney, Agent, or Firm*—F. A. Gonzalez

[57] ABSTRACT

A method and apparatus for suppression of electrical interferences. A node or point in an electronic circuit which is emitting electrical interferences is located, and a stub member designed to be a resonant transmission line at the frequency being emitted is connected to the node for suppression of the electrical interferences. If suppression is to occur between two points that are both electrically insulated from one another, a balanced line may be used. A second parallel stub tuned to the even harmonic of the fundamental frequency may be used to suppress both the even and odd harmonics of the fundamental frequency of the electrical interference. Parallel stubs may also be used to broaden the null as in a multipole filter. Tuning elements such as variable capacitors may be used with the stub members to tune to the exact frequency to be suppressed.

13 Claims, 4 Drawing Sheets

SUPPRESSION OF ELECTRICAL INTERFERENCES FROM AN ELECTRONIC CIRCUIT

BACKGROUND OF THE INVENTION

The present invention relates to the suppression of electro-magnetic interference (EMI) emissions from an electronic circuit, and more particularly relates to the use of a resident transmission line for the suppression of electrical interferences from an electronic circuit.

Large electronic systems such as main frame computer systems have many EMI problems related to the fundamental clock frequency and its harmonics. Although the source of this radiation can be directly attributed to the delta I switching currents generated on circuit modules of the large system, the noise presents little problem until it is coupled to some form of an antenna. In the case of large systems, the antenna is bus bars used to connect DC power to the circuit module boards. Once the noise exists on the board, it travels on the bus bars and either radiates or couples to cables in their proximity. The noise can then leave the cabinet or box of the computer system by means of cables exiting from the bottom of the computer frame.

To minimize this noise, various techniques have been tried such as covering exiting holes in the computer frames, moving cables from noisy locations, and using conductive paint, gaskets and grommets where applicable. Ceramic decoupling capacitors have also been added to the bus bars where they attach to the circuit module boards.

SUMMARY OF THE INVENTION

In the present invention, resonant transmission lines are designed for the noise frequency to be suppressed and connected at specific points to force a low impedance for the radiation to be suppressed at that location. The specific points may include power buses where they are connected to circuit modules, or any location in a circuit, on a card or board having a noise frequency to be suppressed. If the selected point is in a DC power distribution system where a shorted transmission line cannot be used, an open transmission line is used. An open transmission line having a length of an odd number of quarter wavelengths from the end of the line creates a low impedance which effectively creates a short circuit at the frequencies of odd harmonics resonant at that quarter wavelength.

Since a low impedance is being created at the point where the transmission line is connected, any number of transmission line stubs can be paralleled without interaction. If there are several frequencies to be suppressed present, transmission lines can be chosen to short out the undesired ones. For a single basic clock frequency switching at digital rates, one lowest frequency, the fundamental frequency, will tend to predominate and all harmonics of that frequency will be present. A resonant transmission line tuned to the fundamental frequency will suppress the first, third, fifth and all higher odd harmonics. A second resonant transmission line tuned to the second harmonic will suppress the second, sixth, tenth and other odd multiples of the even harmonics. Where the chosen location is a node in a circuit, on a card or a board, the resonant transmission line is a shorted transmission line.

It is therefore an object of the present invention to provide for suppression of electrical interferences from a node of an electronic circuit using a resonant transmission line for the frequency of the interference to be suppressed which is attached to the node of the electronic circuit.

It is a further object of the present invention to provide for suppression of electrical interferences from a node of an electronic circuit using a resonant transmission line wherein the resonant transmission line is an open transmission line.

It is a further object of the present invention to provide an apparatus for the suppression of electrical interferences from a node of an electronic circuit using a resonant transmission line wherein the resonant transmission line is a shorted transmission line.

It is a further object of the present invention to provide a plurality of resonant transmission lines each tuned to a different frequency to provide a band of frequencies to be suppressed.

It is a further object of the present invention to provide for suppression of electrical interferences from a node of an electronic circuit using a resonant transmission line wherein the resonant transmission line includes a tuning element for tuning the frequency at which the transmission line resonates.

It is a further object of the present invention to provide for suppression of electrical interferences using a resonant transmission line having a tuning element wherein the tuning element is a variable capacitor.

The foregoing and other objects, features and advantages of the invention will be apparent from the following more particular description of the preferred embodiment of the invention as illustrated in the drawings.

DESCRIPTION OF THE PREFERRED EMBODIMENT

The transmission line of the present invention can be of any form; concentric, parallel balanced, etc. It can be formed in stripline over a ground plane or stripline as a balanced parallel feed. If the point at which interference is to be suppressed is referenced to a ground or signal reference plane, a standard concentric transmission line, as shown herein, may be used. If suppression is to occur between two points that are both floating relative to the nearest frame or reference planes, a shielded balanced line is used so that there is less loss or radiation from the transmission stub itself.

Although the low impedance created by the transmission line is resonant at specific frequencies with a very high Q, there could be a frequency sensitivity that would appear with physical variations in the fabricated assembly. Since a low impedance is created, additional parallel stubs can be used to broaden the null as in a multi-pole filter.

The impedance of the transmission line is related to how good an open circuit is at the other end of the line, reflected back, as though the line characteristics impedance is the geometric mean between the low impedance created and the open circuit at the far end of the line. This impedance may be described by:

$$Z_{short} = \frac{(Z_0)^2}{Z_{open}} = \frac{L}{(Z_{open} \times C)}$$

Since the desire is to achieve a very low impedance at the null, a low line impedance is used.

Attenuation, or line loss, is generally dominated by series resistance. The attenuation factor can be approximated by:

$$\alpha = \frac{R}{2}\sqrt{\frac{C}{L}}$$

Thus, the low line impedance is created using higher capacitance on the line. This increase in capacitance also increases propagation time on the line by a factor of the square root of capacitance, thereby shortening the dimension required to achieve a quarter wavelength.

Figure 1:
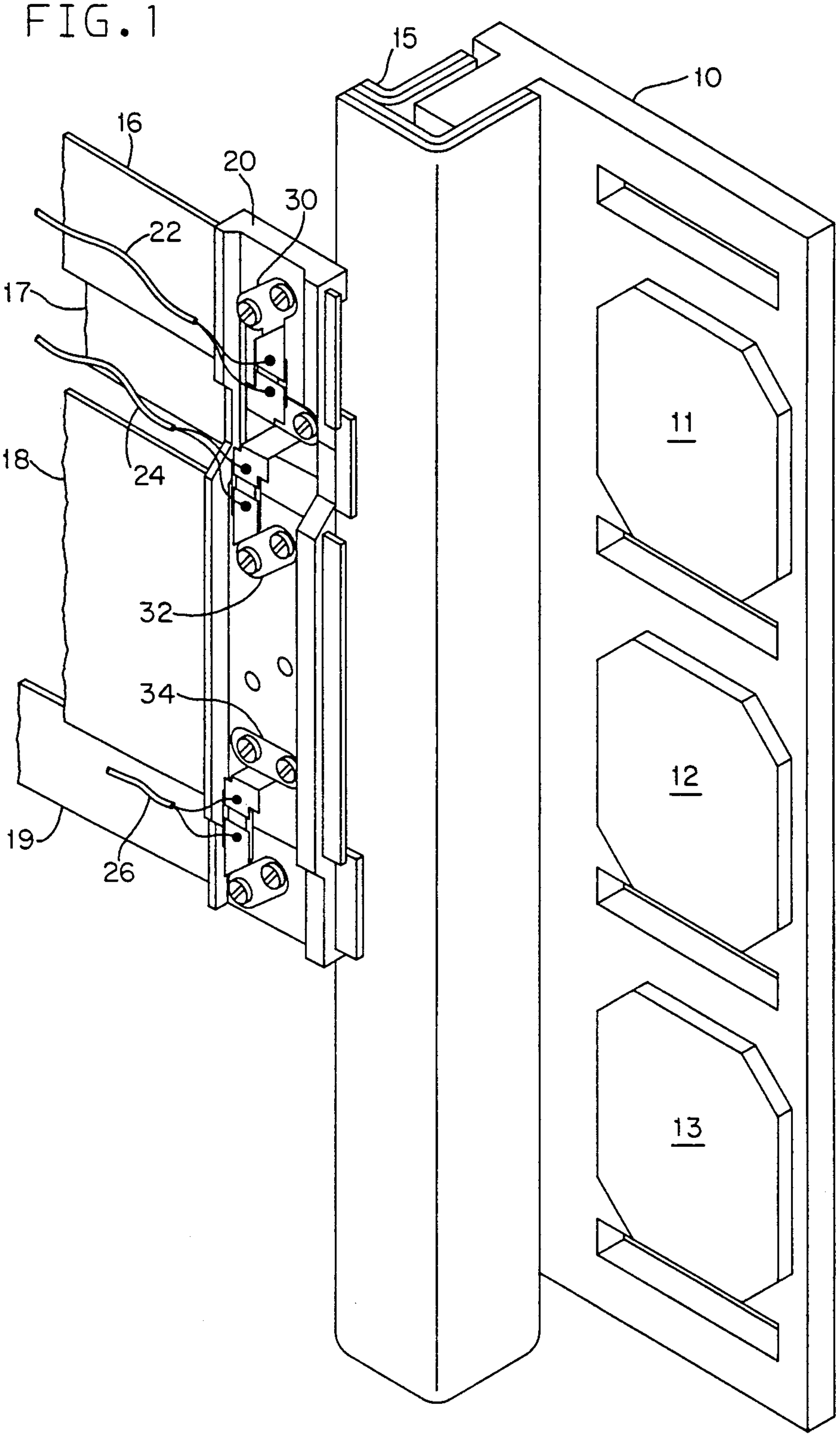
FIG. 1 is a perspective drawing showing power bus bars connected to circuit modules of a mainframe computer system with resonant transmission lines of the present invention connected between bus bars.

FIG. 1 is a perspective drawing of a frame 10 on which are mounted a number of circuit modules 11, 12 and 13. The circuit modules 11, 12 and 13 are connected by means of an edge assembly 15 to bus bars 16, 17, 18 and 19. The bus bars 16 through 19 provide voltages at different potentials to circuits of the circuit modules 11, 12 and 13. The bus bars 16 through 19 are held in place by an insulating bracket member 20 such that the bus bars 16 through 19 are held rigidly in place and electrically insulated from one another. Stub members 22, 24 and 26 are open resonant transmission lines and are attached between the bus bars to provide a null on the bus bars at the resonant frequencies of the stubs 22, 24 and 26 for suppressing electrical interferences at those frequencies. Stub 22 is connected to a bracket member 30 which provides for connections between the open transmission line of the stub 22 to bus bars 16 and 17. Stub 24 is likewise connected between bus bars 17 and 18 by bracket member, 32, and a bracket member 34 connects stub member 26 between bus bars 18 and 19. The actual connection between the bus bars 16 through 19 by corner member 15 to the circuits of circuit modules 11 through 13 are well known in the art, and will not be discussed further as they are not part of the present invention.

Figure 2:
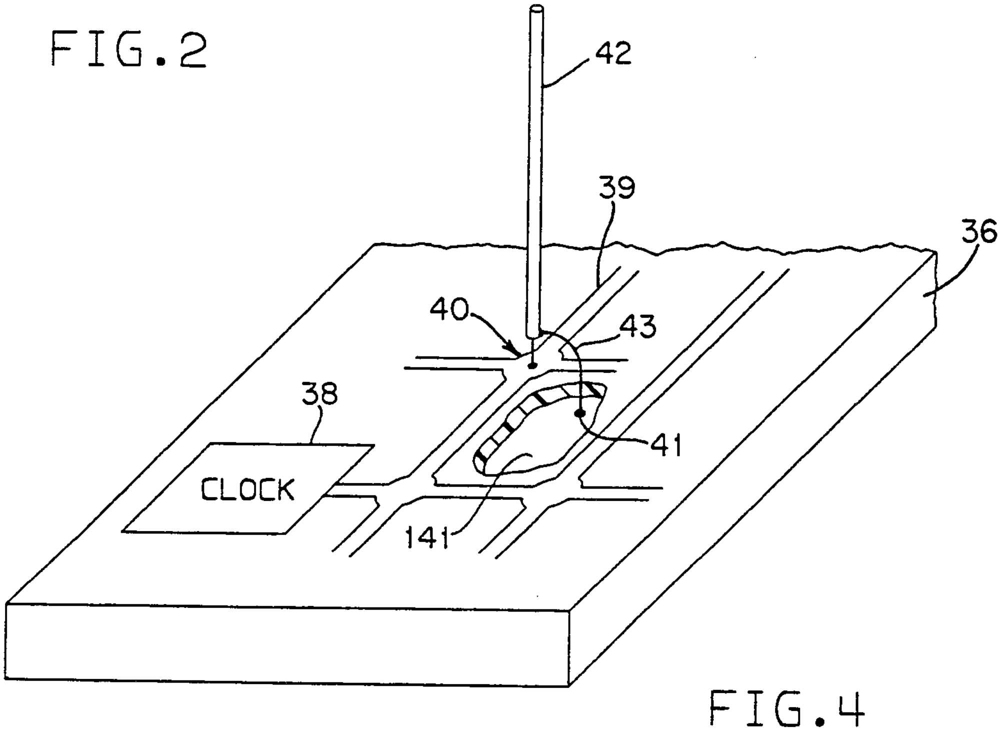
FIG. 2 is a perspective drawing of a portion of a printed circuit board having a resonant transmission line connected to one node of the printed circuit, a portion of which is broken away to expose a ground or signal plane.

FIG. 2 is a perspective drawing of a circuit board 36 which might be found, for instance, in one of the circuit modules 11 and 13. The circuit board 36 typically contains a clock circuit 38 whose switching frequencies cause electrical interferences to be radiated from the circuit 39 of the circuit board 36. In the present invention, a node 40 of the circuit 39 having the undesired electrical interference is located and a stub 42 is connected to the node 40 for suppression of the undesired electrical interference. In the case of FIG. 2, the stub 42 may be a shorted transmission line, that is, a first conductor in the stub 42 is connected to the node 40, and a second conductor is connected to, for instance, the ground or signal reference plane 141 at 41 by a lead 43, as previously mentioned.

Figure 4:
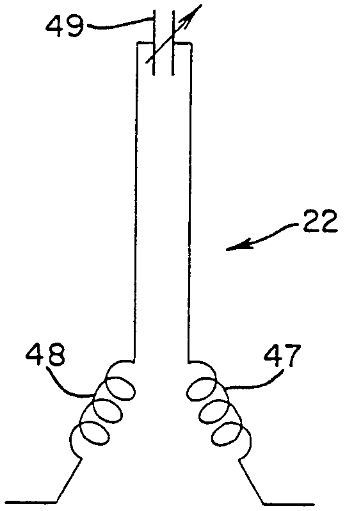
FIG. 4 is a schematic diagram of the resonant transmission line of FIG. 3 having a tuning capacitor connected to the distal end of the transmission line.
Figure 3:
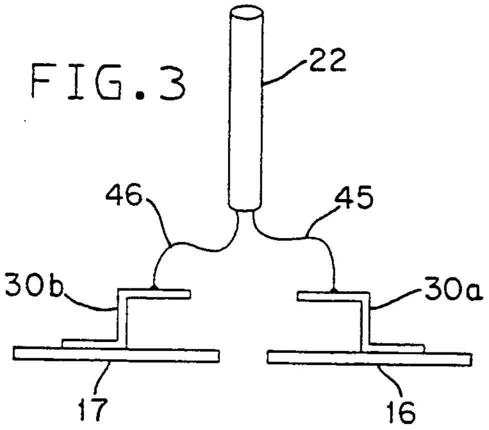
FIG. 3 is an illustration of a resonant transmission line of the present invention connected between brackets of the bus bars of FIG. 1.

FIG. 3 is a drawing of one of the stubs 22 of FIG. 1. The stub 22 is an open transmission line, and may be, for instance, a coaxial cable having its center conductor connected by a lead 45 to a portion of the bracket *30a* which is connected to bus bar 16, and having its concentric shield connected by a lead 46 to a second portion *30b* of the bracket member which in turn is connected to bus bar 17. As shown in FIG. 3, the bracket portions *30a* and *30b* are electrically isolated from one another such that the bus bars 16 and 17 maintain their separate potentials. FIG. 4 is a schematic diagram of the stub 22 of FIG. 3. Inductance 47 represents the inductance of the bracket *30a* and the lead 45, and the inductance 48 represents the inductance of the bracket *30b* and its lead 46. A variable capacitor 49 may be added to the end of the stub 22 at its distal end, or the end opposite the end of the stub which is connected to the bracket member 30. Variable capacitor 49 may be used to tune the exact frequency at which the open transmission line of stub 22 resonates, thereby tuning to the frequency of the electrical interference to be suppressed.

Figure 5:
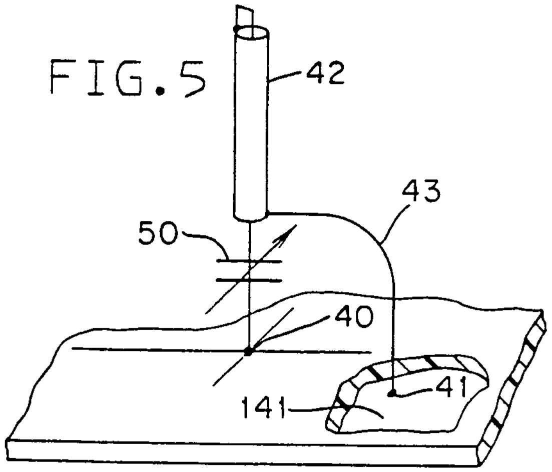
FIG. 5 is a schematic diagram of the shorted transmission line of FIG. 2 and having a tuning capacitor at the connection end of the transmission line.

FIG. 5 is a schematic diagram of the stub 42 of FIG. 2 showing a variable capacitor 50 at the end of the stub 42 which is connected to the node 40. This configuration may be used when the transmission line of the stub is a shorted transmission line. In the case where a coaxial cable is used, the center conductor is shorted to the concentric shield, and the concentric shield is shorted to the circuit board at 41 by the lead 43.

Figure 6:
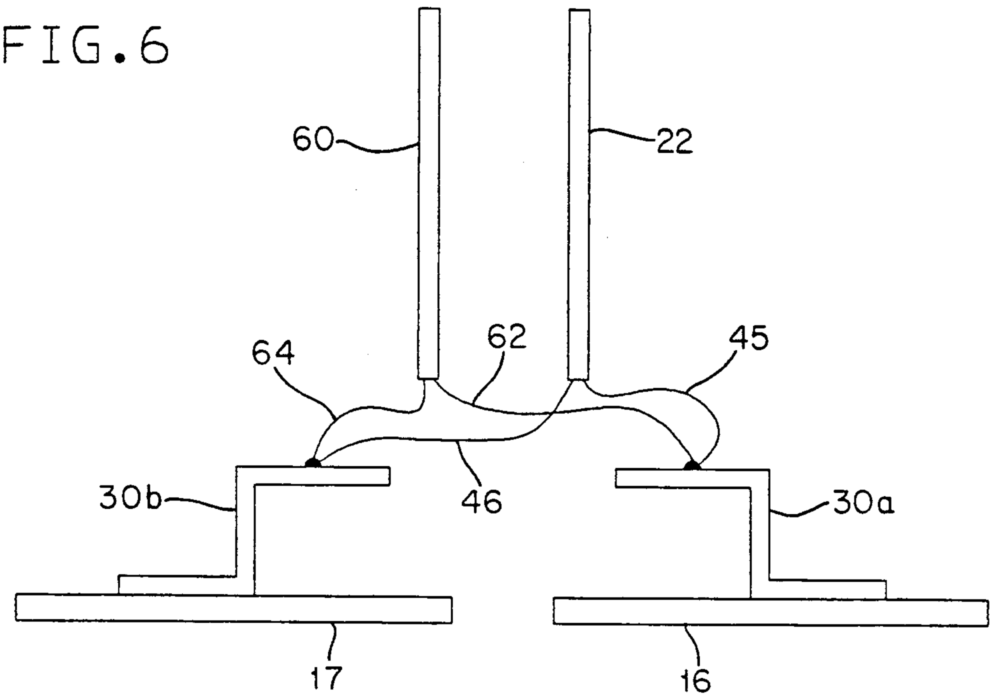
FIG. 6 is a drawing of a pair of resonant transmission lines connected between brackets of the bus bars of FIG. 1.

FIG. 6 shows one of the transmission line stubs 22 connected between the bus bars 16 and 17, and a second stub 60 also connected between the bus bars 16 and 17 by leads 62 and 64. The second stub 60 may be tuned to suppress even harmonics of the fundamental frequency of stub 22, or may be tuned to provide a band of suppression in the manner of a multi-pole filter.

Figure 7:
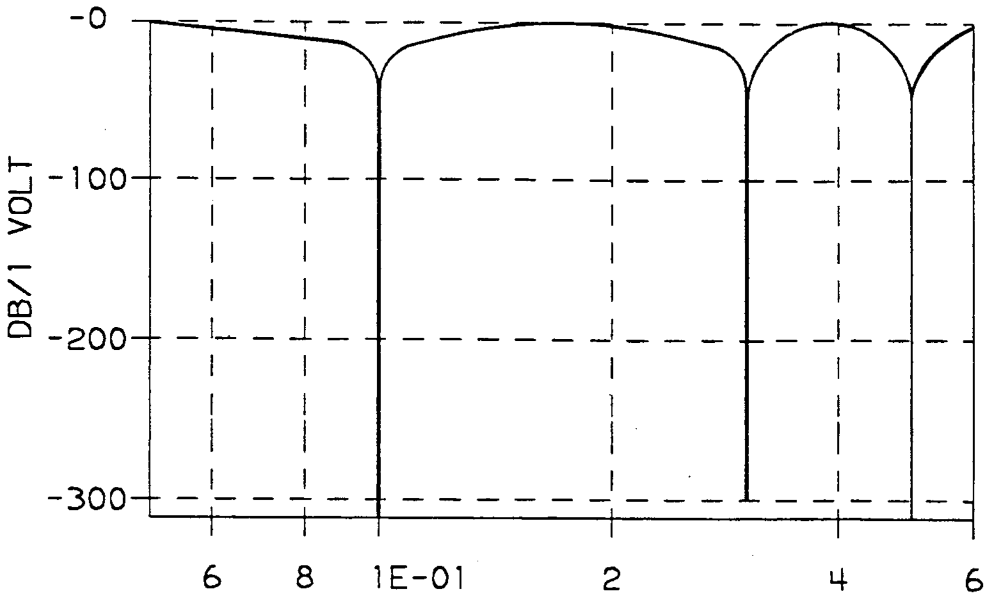
FIG. 7 is a plot of the suppression of electrical interference versus frequency for a single resonant transmission line.

FIG. 7 is a graph showing the suppression of the fundamental and odd harmonics of electrical interference when a transmission line is tuned to the fundamental frequency. In FIG. 7, the transmission line is tuned to a fundamental frequency of 100 megahertz, and as shown, the odd harmonics of 300 megahertz and 500 megahertz would also be suppressed.

Figure 8:
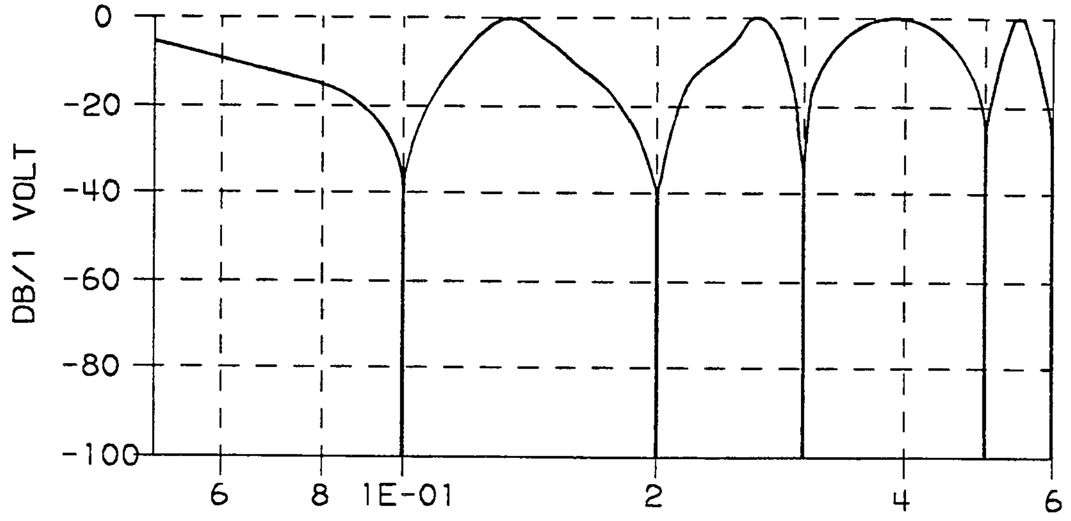
FIG. 8 is a plot of the suppression of electrical interference versus frequency of a pair of resonant transmission lines showing the effect of parallel transmission lines covering the odd and even harmonics of a frequency to be suppressed.

FIG. 8 is a chart showing the suppression of frequencies of electrical interference when two transmission lines are used, one tuned to the fundamental frequency and one tuned to the even harmonics of the fundamental frequency. In the case of FIG. 8, the fundamental frequency is 100 megahertz. As shown, the first transmission line suppresses the fundamental frequency of 100 megahertz and its odd harmonics of 300 and 500 megahertz. A second transmission line tuned to the even harmonics of the fundamental frequency would suppress electrical interferences of 200 megahertz and 600 megahertz.

Figure 9:
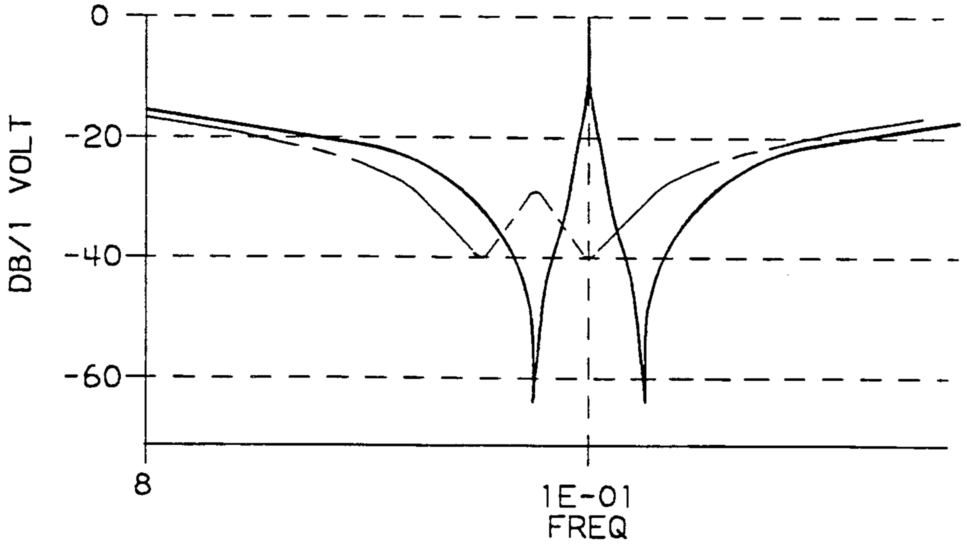
FIG. 9 is a plot of suppression of electrical interference versus frequency of a double line suppressor tuned to suppress a band of interference frequencies.

FIG. 9 is a chart of the suppression of electrical interferences when two lines having close resonant frequencies are used to suppress a band of electrical interferences between 80 and 125 megahertz.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patents is:

1. Apparatus for suppression of electrical interferences from a node of an electronic circuit, said apparatus comprising:

a stub member designed to be a resonant transmission line at the frequency of an interference to be suppressed; and attachment means for attaching one end of said stub member to said node, thereby suppressing the emitting of electrical including a pair of bracket members each means including a pair of bracket members each electrically insulated from the other, and the resonant transmission line of said stub member including a first conductor connected to one of said bracket members and second conductor connected to the other of said bracket members.

2. The apparatus of claim 1 wherein said stub member is an open transmission line.

3. The apparatus of claim 1 wherein said stub member is a shorted transmission line.

4. The apparatus of claim 1 wherein said stub member includes a plurality of line elements, each line element designed to resonate at a specific frequency of an interference to be suppressed.

5. The apparatus of claim 1 wherein said stub member includes a plurality of line elements, each line element designed such that the cumulative effect of said line elements suppresses a desired band of interference frequencies.

6. The apparatus of claim 1 further comprising a tuning element connected to said stub member for tuning the frequency at which the formed transmission line resonates.

7. The apparatus of claim 6 wherein said tuning element is a variable capacitor.

8. The apparatus of claim 1 further comprising a tuning member connected to the end of said stub member removed form the end by which said stub member is attached to said node by said attachment means.

9. The apparatus of claim 8 wherein said tuning element is a variable capacitor.

10. An apparatus for suppression of EMI radiations comprising:

an electronic circuit having a node which acts as an antenna emitting radiations to be suppressed, said node having separate electrical components electrically insulated from one another;

a stub member having a first conductor connected to one of said separate electrical components, and a second conductor connected to another of said separate electrical components, said stub member forming a resonant transmission line for suppressing said EMI radiations.

11. The apparatus of claim 10 further comprising a tuning member connected to said stub member for tuning the frequency at which the formed resonant transmission line resonates.

12. The apparatus of claim 11 wherein said tuning member is a variable capacitor.

13. The apparatus of claim 12 wherein said variable capacitor is connected intermediate said first and second conductors at the end of said first and second conductors removed from the ends connected to said separate electrical components.

* * * * *

UNITED STATES PATENT AND TRADEMARK OFFICE
CERTIFICATE OF CORRECTION

PATENT NO. : 5,063,362

DATED : Nov. 5, 1991

INVENTOR(S) : P.A. Herman et al

It is certified that error appears in the above-identified patent and that said Letters Patent is hereby corrected as shown below:

Col. 5, Claim 1, lines 9 & 10, "including a pair of bracket members each" should be -- interference from said node; said attachment --.

Col. 6, Claim 8, line 3, "form" should be -- from --.

Col. 6, Claim 9, line 1, "8" should be -- 1 --.

Signed and Sealed this

Fifth Day of October, 1993

Attest:

BRUCE LEHMAN

*Attesting Officer*

*Commissioner of Patents and Trademarks*